Feb. 16, 1937.   A. R. SWICKARD   2,071,005
WOODWORKING MACHINE
Filed Jan. 22, 1935   2 Sheets-Sheet 2
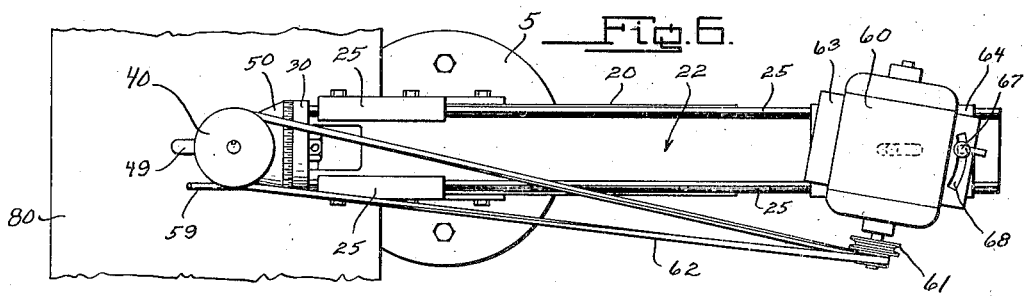
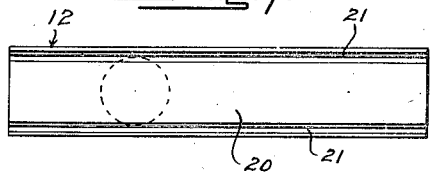
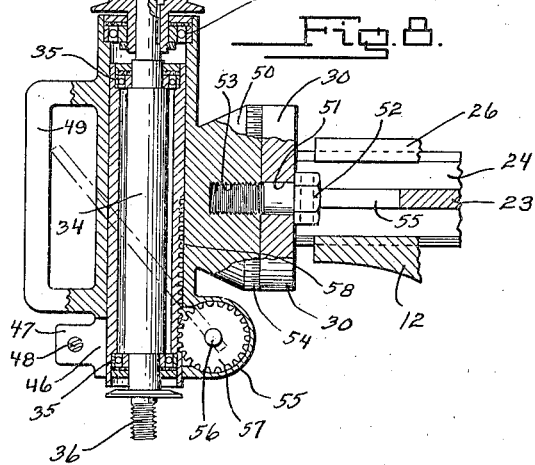
INVENTOR,
Arthur R. Swickard.
BY Lancaster, Allwine and Rommel
ATTORNEYS.

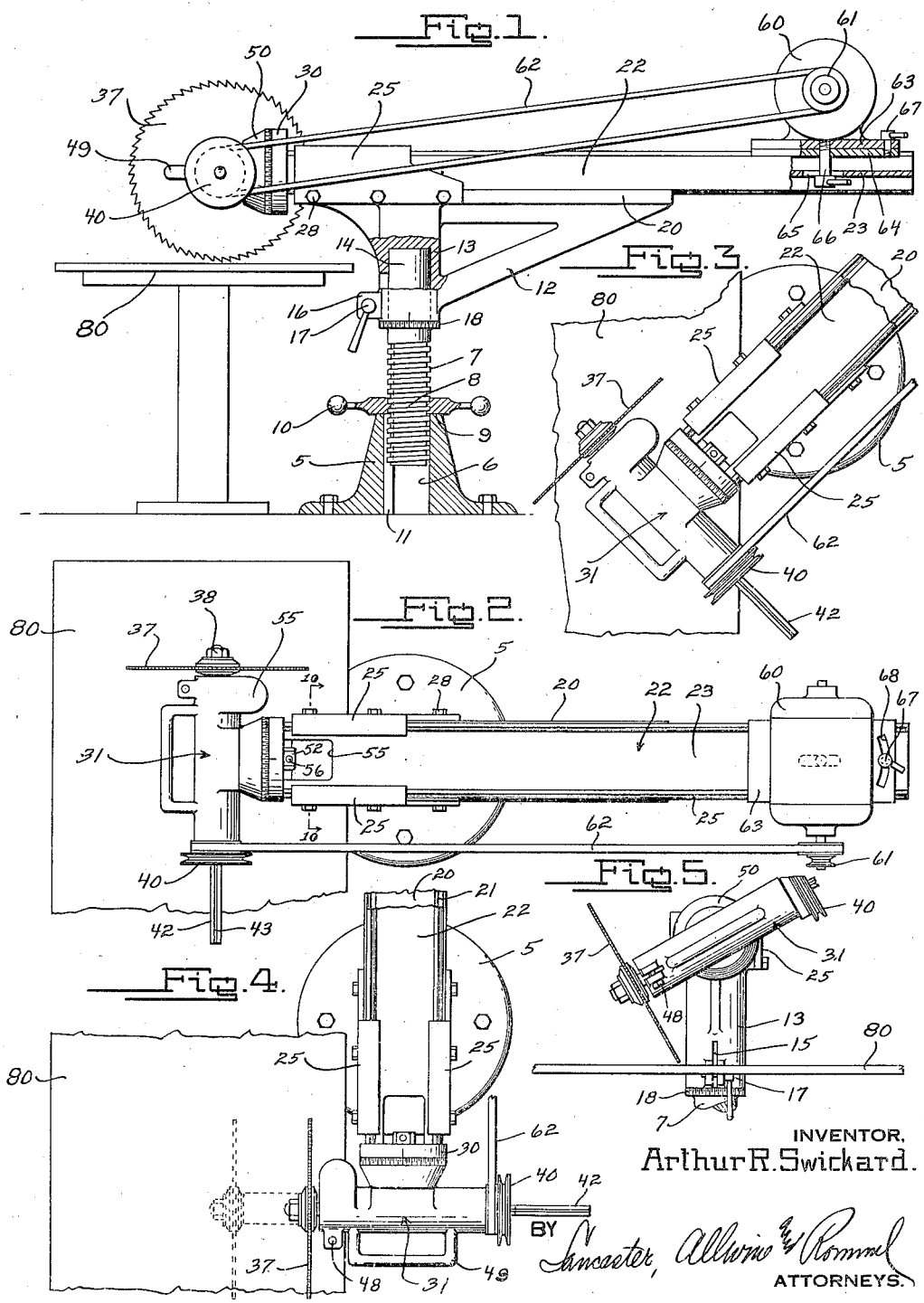

Patented Feb. 16, 1937

2,071,005

UNITED STATES PATENT OFFICE 2,071,005

WOODWORKING MACHINE

Arthur R. Swickard, Sheridan, Wyo., assignor to
W. F. Harnly, Sheridan, Wyo.

Application January 22, 1935, Serial No. 2,941

4 Claims. (Cl. 144—3)

The present invention relates to wood working machines and the primary object of the invention is to provide a power operated belt driven slide saw capable of performing various sawing operations, and readily adjustable for use as a drill press.

A further object of the invention is to provide a belt driven slide saw which thru adjustment may be adapted for use as a drill press, spindle shaper and hollow chisel morticer, as well as performing various other operations such as grinding, sanding, etc.

A further object of the invention is to provide a wood working machine of this character embodying a saw shaft or mandrel carrying head which is adjustable about an axis at a right angle to the axis of rotation of the saw shaft whereby compound miter cuts may be made when using the machine for sawing, and the shaft disposed in a vertical position for use as a drill press.

A further object of the invention is to provide a wood working machine wherein the tool carrying shaft or mandrel is carried upon one end of a horizontally guided slide having swinging movement about a vertical axis, and which slide also forms a support for the motor having a belt drive connection with the shaft or mandrel.

Other objects and advantages of the invention will appear in the following detailed description, taken in connection with the accompanying drawings forming a part of this specification and in which drawings:—

Figure 1 is a view part in side elevation and part in vertical section of a wood working machine constructed in accordance with this invention and showing the same in use as a slide saw.

Figure 2 is a top plan view of the machine in a position for cross cut sawing.

Figure 3 is a fragmentary top plan view showing the upper structure adjusted about a vertical axis for making a miter cut.

Figure 4 is a top plan view showing the machine in a position for ripping or plowing and showing by dotted lines the saw extended for making cuts of various widths.

Figure 5 is a fragmentary front plan view showing the saw in a different position of use.

Figure 6 is a top plan view of the machine set for use as a drill press.

Figure 7 is a top plan view of the frame member forming a trackway for the slide.

Figure 8 is an enlarged longitudinal section thru the tool head and showing the manner of mounting the tool head upon the slide.

Figure 9 is a front elevation of the tool head arranged for use as a drill press and showing a chuck applied to the saw shaft.

Figure 10 is an enlarged fragmentary transverse section on the line 10—10 of Figure 2.

In the drawings, and wherein like reference characters designate corresponding parts thruout the several views, the machine is of a portable, self-contained type and embodying a preferably metal stand or pedestal 5 having a flanged bottom whereby the stand may be suitably anchored in place for use. The stand 5 is provided with a vertically extending opening 6 for slidably receiving a vertically movable standard 7 having a screw threaded lower end portion 8 having a sliding fit in the opening 6. The upper end of the stand 5 provides an annular seat 9 forming a rest for a screw wheel 10 thru which is screw threaded the threaded end portion 8 of the standard 7. A key 11 in the opening 6 operates in a suitable keyway in the standard 7 for preventing rotation of the standard when the screw wheel 10 is rotated for causing raising and lowering of the standard.

Rotatably supported upon the upper end of the standard 7 to swing about a vertical axis is a frame member 12 having a socket portion 13 receiving with a rotating fit the plain upper end 14 of the standard. The lower end of this socket portion 13 is slit longitudinally as shown at 15 in Figure 5 and ears 16 are provided at each side of the slit for receiving a clamping screw 17 whereby the socket portion may be clamped in adjusted positions of rotation about the upper standard portion 14. The standard 7 is provided with a suitable scale 18 co-acting with a suitable marker on the socket portion 19 to indicate the degree of rotation of the frame member 12 upon the standard.

Formed at the upper end of the frame member 12 is an elongated, flat trackway 20 which projects both forwardly and rearwardly from the socket portion 13. Provided in the upper face of the trackway 20 and opening at the ends thereof is a pair of parallel track grooves 21 preferably of V-shape as shown more clearly in Figure 10. These track grooves 21 as will be observed are arranged closely adjacent the longitudinal edges of the trackway.

Slidably supported upon the trackway 20 and having guided movement in the track grooves 21, is a slide member 22 in the form of an I beam providing a horizontal web portion 23 and vertical flange portions 24. The lower edges of these flanges 24 are beveled off to have a sliding fit in the V-shaped track grooves 21 thruout the length of the trackway 20. Secured along each side edge of the trackway 20 adjacent the forward end of the trackway, is a guide member 25. These guide members 25 have inwardly directed flanges 26 along their upper edges which overlie the upper edges of the flanges 24 and have their under sides longitudinally grooved with V-shaped grooves 27 for receiving the double beveled upper edges of the flanges 24. These guide members 25 are secured to the trackway 20 by means of bolts 28 which extend thru slots 29 in the vertical portions of the guide members, and these slots 29 will permit vertical adjustment of the guide members to take up for any wear on the slide 22. The guide members 25, as will be observed, retain the slide member 22 in sliding contact upon the trackway 20.

Carried at the forward end of the slide member 22 is a preferably circular pivot plate or disc 30 providing a mounting for a tool head designated as a whole by the numeral 31. This tool head 31 is arranged to have swinging movement about an axis parallel to the line of sliding movement of the slide member 22 and at a right angle to the axis about which the frame member 12 may swing.

The tool head 31 comprises a tubular casing or body portion 32 in which is slidably fitted a sleeve 33. This sleeve 33 provides a rotary support for a shaft or mandrel 34 which extends axially thru the sleeve. The shaft 34 is preferably mounted in the sleeve 33 by means of roller bearings 35 mounted in opposite ends of the sleeve and these bearings also serve to retain the shaft against axial movement in the sleeve. One end of the shaft 34 projects slightly beyond one end of the sleeve 33 and may be screw threaded as at 36 for attachment of a circular saw 37 by means of a clamping bolt 38. This threaded end 36 may also serve for receiving a chuck 39 such as shown in Figure 9 when the machine is to be used as a drill press.

Journaled in one end of the casing 32 is a double cone pulley 40 having an axial opening 41 for slidably receiving a reduced stem portion 42 of the shaft 34. This stem portion 42 is provided with a keyway 43 receiving a key 44 in the pulley 40 whereby rotation may be imparted to the shaft 34 and the shaft also permitted to move axially with the sleeve 33. The pulley 40 may be rotatably mounted in the casing 32 by means of a suitable roller bearing 45.

The casing 32 is slotted at one end as at 46 and provided at opposite sides of this slot are ears 47 for receiving a clamping bolt 48 whereby the casing may be clamped about the sleeve 33 for retaining the sleeve in adjusted positions longitudinally in the casing. When the machine is used for sawing, the sleeve 33 is normally clamped in a fixed position within the casing 32 whereby the saw shaft or mandrel 34 is held against axial movement. An open handle 49 extends along one side of the casing 32 and preferably in alignment with the slot 46.

Projecting from the rear side of the casing 32 midway of the ends of the casing is a mounting block or head 50 of circular formation and having a flat face for abutting against the flat forward face of the pivot plate or disc 30. The pivot plate or disc 30 is provided with a plain axial opening 51 for receiving the shank of a clamping bolt 52 adapted to be threaded into a screw threaded bore 53 formed axially in the circular head 50. The head of the bolt 52 engages upon the rear face of the disc 30 so that when the bolt is threaded into the socket 53, the tool head will be clamped in position upon the pivot plate 30. The mounting block 50 is provided with a scale 54 which co-acts with a suitable marking on the periphery of the disc 30 whereby the tool head may be rotated to various degrees of adjustment about the bolt 52 as an axis. As will be observed particularly in Figures 2 and 8, the web 23 of the slide member 22 is cut out as at 55 so as to permit placing and rotating the bolt 52. The head of the bolt 52 is provided with a transverse opening 56 to receive a suitable bar or the like for rotating the bolt.

Projecting rearwardly from the casing 32 and preferably in diametric alignment with the ears 47 is a hollow extension 55 in which is rotatably mounted as upon a shaft 56, a pinion 57 having its teeth arranged to mesh with a rack 58 formed longitudinally in the sleeve 33. This rack and pinion serve to project the sleeve 33 and the spindle 34 when the machine is used as a drill press as in Figure 9. A removable drill handle 59 may connect with the shaft 56 for imparting rotation to the shaft.

The saw shaft or mandrel 34 is intended to be belt driven by a motor 60 mounted upon the rear portion of the slide member 22 and adjustable on the slide member to properly align with various positions of use of the tool head 31. The electric motor 60 is provided with a double cone pulley 61 whereby different speeds of rotation may be imparted to the saw shaft 34. The cone pulleys 40 and 61 are preferably V-shaped pulleys for use with a V-shaped belt 62 providing a driving means between the motor and tool head.

The motor 60 has a flat base plate 63 adapted to engage upon a flat rest plate 64 slidably fitting on the upper edges of the upright flanges 24 of the slide member 22. The rest plate 64 is thus guided for sliding movement longitudinally of the slide member. The web 23 of the slide member is longitudinally slotted as at 65 in Figure 1 for receiving the shank of a clamping bolt 66 which extends upwardly thru the rest plate 64 and is threaded into the motor base plate 63. Thus, by loosening the bolt 66 the motor may be adjusted longitudinally of the slide member 22 to adjust the belt 62. A motor adjustment is also provided to permit the motor 60 to be rotated slightly for aligning the pulley 61 with the pulley 40 when the machine is used as a drill press as in Figure 6 and this means preferably comprises a clamping bolt 67 extended thru an arcuate slot 68 in the motor base plate 63 and threaded into the rest plate 64 whereby the motor may be clamped in adjusted angular positions. This swinging of the motor prevents the runs of the belt from rubbing upon one another when the tool head is swung from a position for sawing as in Figure 1 to the drill press position as in Figure 6.

Any suitable form of table or work support such as shown at 80 may be provided for supporting the work being operated upon either when sawing or drilling.

When using the machine for sawing, the operator first adjusts the depth of the cut by rotating the screw wheel 10 so as to raise or lower the frame member 12 and the saw 37 with respect to the work support 80. If cross-cutting is to be done, the frame member is swung to the position shown in Figures 1 and 2 and the proper cross cutting position may be determined by means of the scale 18. After the frame 12 has been rotated to the desired position, the clamping screw 17 is tightened for holding the frame member in its proper position. The work is then placed upon the support 80 and the operator merely grasps the handle 49 and draws the tool head forwardly whereupon the slide member 22 and the motor 60 will move forwardly with the tool head. When the tool head is moved rearwardly, the pivot plate 30 abuts against the forward end of the track 20 and guide members 25 to limit rearward movement of the tool head. If a miter cut is to be made as in Figure 3, the operator merely rotates the frame 12 on the standard 7 to the desired degree as indicated on the scale 18.

When using the machine for ripping, the frame member 12 is swung so that the saw 37 extends parallel with the work support 80 as in Figure 4. If different widths and cuts are to be made, the clamping nut 48 may be loosened thus allowing the sleeve 33 to be withdrawn for the desired extent from the casing 32 as shown by dotted lines in Figure 4 and after which the bolt 48 may again be tightened for securing the saw in its outwardly adjusted position.

When using the machine as a drill press, the saw 37 is removed and a chuck as at 39 is applied to the threaded end 36 of the shaft or mandrel 34. The clamping bolt 52 may then be loosened and the tool head 31 moved to a vertical position as in Figures 6, 8, and 9. The bolt 52 may then be tightened for retaining the tool head in position. The clamping bolt 48 is then loosened allowing the sleeve 33 to have free sliding movement in the casing 32 by means of the pinion and rack 57 and 58. The motor 60 is adjusted on the slide member 22 to compensate for the change in spacing between the pulleys 40 and 61 caused when the pulley 40 is swung from its vertical position to a horizontal position.

Thus it will be seen that a wood working machine of improved construction has been provided which is readily adjustable for performing various sawing operations and which is also adjustable into position for use as an efficient drill press.

Various changes in the shape, size and arrangement of parts may be made to the form of invention herein shown and described, without departing from the spirit of the invention or the scope of the following claims.

What is claimed is:

1. In a wood working machine, a support, a frame mounted on the support, a slide member reciprocally guided on the frame, a tool head rotatably adjustable on one end of the slide member, a tool carrying shaft rotatable and axially adjustable in the tool head, a motor adjustably mounted on the other end of the slide member for compound adjustment relative to the slide member, and drive coupling means between the motor and said shaft embodying an endless belt.

2. In a wood working machine, a support, an elongated slide member reciprocally guided on the support, a tool head rotatably adjustable on one end of the slide member on the longitudinal axis of the slide member, a saw shaft rotatable and reciprocally movable in the tool head on an axis intersecting at a right angle the axis of rotation of the tool head, a pulley mounted against axial movement on the tool head and rotatable with the shaft, a motor adjustably mounted for compound adjustment on the opposite end of the slide member and having a pulley, and a drive belt connecting said pulleys.

3. In a wood working machine, a frame having a trackway, a slide member reciprocally movable on the trackway, a tool head rotatably adjustable upon by the forward end of the slide member embodying a tubular casing, a pulley journaled in one end of the casing, a sleeve axially movable in the casing, a tool carrying shaft journaled in the sleeve and embodying a stem portion splined to said pulley, a motor adjustably mounted for compound adjustment upon the rear portion of the slide member and having a pulley, and a drive belt connecting said pulleys.

4. In a wood working machine, a supporting frame having a trackway, a slide member reciprocally guided on the trackway, a tool head adjustably mounted on the forward end of the slide member and embodying a tubular casing, a sleeve fitting in said casing, rack and pinion means for adjusting the sleeve axially in the casing, means for securing the sleeve in adjusted positions, a shaft journaled in the sleeve for movement axially with the sleeve and having a stem portion provided with a keyway, a pulley journaled in one end of the casing and thru which said stem portion projects, a key on the pulley for engaging in said keyway, a motor mounted for compound adjustment on the slide member and having a pulley, and a belt connecting said pulleys.

ARTHUR R. SWICKARD.